Patented Aug. 9, 1932

1,871,200

UNITED STATES PATENT OFFICE

WALTER P. RALEIGH, OF AMES, IOWA, ASSIGNOR TO PITTSBURGH PLATE GLASS COMPANY, A CORPORATION OF PENNSYLVANIA

METHOD OF DISINFECTING CORN AND LIKE SEED AND DISINFECTANT USED THEREIN

No Drawing.    Application filed December 16, 1927.  Serial No. 240,646.

This invention consists in a method of disinfecting corn and like seed and the fungicide used as a disinfectant therein.

The method is particularly applicable to seed corn, which is subject to attack by certain known internal parasites as Diplodia zeae, Basisporium gallarum, and Gibberella sanbinnetti, dry rots and surface-borne fungi. It is not applicable to such internal plant parasites as the loose smuts of wheat and barley.

In the preferred practice of my method, I form a dust disinfectant in the following manner. 27.6 grams of mercuric chloride ($HgCl_2$) is dissolved in 11400 cubic centimeters of distilled water. 428.0 grams of finely ground talc are then added and the mixture agitated until the talc is in suspension. Aqua-ammonia is then added in quantity sufficient to precipitate the mercury and to leave a slight excess. The reacting mixture may be heated, if desired; however, I prefer to operate at temperatures below 40° C. Agitation is continued during and after the addition of the ammonia until the reaction is complete, giving an infusible white precipitate which is largely deposited upon the talc. The mixture is then filtered, dried, and pulverized until the dust is fine enough to stick well to the smooth surfaces of the seeds upon which it is dusted. Other inert, finely divided materials than talc may be employed, if desired; for example, graphite or silicious materials such as finely divided silica, clay or other similar silicates.

The product has very desirable fungicidal properties for seed corn, giving no practical interference in the planter box when the seed is planted. The use of graphite as the inert substance is particularly desirable as it aids in lubricating the parts of the planter in which the treated seed is used. It is extremely effective as a fungicide, being more effective under comparative tests than any like fungicides or disinfectants now known. It is consumed in the dusting process at the rate of about 2 ounces per bushel of seed corn.

Having now described a typical procedure by following which, one skilled in the art can manufacture the disinfectant in what I now believe to be its preferred form, I will, for the purpose of better clarifying the nature of the invention, explain the reactions which occur in its formation and set forth certain of the possible variants in procedure. The reaction of ammonia upon mercuric chloride produces, as is known to chemists, various more or less complex compounds, all of which I have found to be effective as seed disinfectants. Under the specific conditions set forth in the specific example above, the so-called "infusible" ammonio-basic mercuric chloride is formed. By carrying out the reaction in the presence of ammonium chloride, the fusible form may be produced, which may be hydrolyzed to the infusible form by prolonged action of water. The infusible compound may be further hydrolyzed to the chloride of Millon's base by the action of water.

Broadly speaking, the products are ammonio-basic salts of mercury, under which term I include the more or less hydrolyzed products therefrom which may be designated as the aquo-ammonio basic compounds.

While I prefer to precipitate these ammonio-basic mercuric salts from the solution of mercuric chloride, thus forming the chlorides of the ammonio-mercuric bases, I find that the water insoluble salts are generally effective as seed disinfectants, regardless of the acid radical employed. I have produced and tested large numbers of such compounds by methods known and described in the literature, including ammonia-basic mercuric iodides, bromides, arsenates, nitrates, nitrites, chromates, chlorochromates, sulfates, carbonates, carbamates, sulfates, phosphates, Kane's salt ($Hg_2N_3H_2O_2 3NO_3$), Souberan's salt ($Hg_2NH_2ONO_3$) and others and have found them to be effective as seed disinfectants.

The use of the salts of the ammonio-mercuric bases is peculiarly desirable as a seed disinfectant because, while they have a most effective fungicidal action, they are not harmful to the seeds or their effects in this direction are readily controllable and, at least in the case of chlorides and nitrates, they can be used in concentrations much higher than is required for control purposes.

While the disinfectant made according to the preferred example, above given, contains about 4½% of mercury, it is possible to use both the chlorides and the nitrates in percentages of 2½% to 100%, the remainder being talc or other inert carrier. The excessive use of the fungicide seems to have no deleterious effect on the seeds. Of course, it is preferable to use somewhat more than the minimum permissible in order to be reasonably certain of the fungicidal effectiveness and for reasons of economy, it is desirable to use no more than a reasonable excess. As at present devised, therefore, I prefer the proportions hereinbefore given.

I claim:

1. The herein described process of disinfecting corn and like seeds consisting in dusting the same with finely divided particles containing salts of ammonio-mercuric bases in proportion to supply approximately of 2½% mercury, the remainder being an inert carrier.

2. The herein described process of disinfecting corn and like seeds consisting in dusting the same with finely divided particles containing approximately the chlorides of ammonio-mercuric bases in proportion to supply upwards of 4½% mercury, the remainder being an inert carrier.

3. The herein described finely powdered disinfectant for corn and like seeds comprising an inert carrier and an ammonio-basic mercury salt in proportion to supply upwards of 2½% mercury.

4. The herein described finely powdered disinfectant for corn and like seeds comprising an inert carrier and the chloride of an ammonio-mercuric base in proportion to supply approximately 4½% of mercury.

In testimony whereof, I have hereunto set my hand and affixed my seal this 12th day of December, 1927.

WALTER P. RALEIGH.